United States Patent
Nemat-Nasser et al.

(10) Patent No.: US 10,166,934 B2
(45) Date of Patent: *Jan. 1, 2019

(54) CAPTURING DRIVING RISK BASED ON VEHICLE STATE AND AUTOMATIC DETECTION OF A STATE OF A LOCATION

(71) Applicant: Lytx, Inc., San Diego, CA (US)

(72) Inventors: Syrus C. Nemat-Nasser, San Diego, CA (US); Christopher S. Williams, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 392 days.

This patent is subject to a terminal disclaimer.

(21) Appl. No.: 14/998,043

(22) Filed: Dec. 23, 2015

(65) Prior Publication Data

US 2016/0137142 A1 May 19, 2016

Related U.S. Application Data

(63) Continuation of application No. 13/687,163, filed on Nov. 28, 2012, now Pat. No. 9,344,683.

(51) Int. Cl.
| | |
|---|---|
| *H04N 7/18* | (2006.01) |
| *B60R 11/04* | (2006.01) |
| *G01S 19/23* | (2010.01) |
| *G06K 9/00* | (2006.01) |
| *G11B 27/10* | (2006.01) |
| *H04N 5/232* | (2006.01) |
| *H04N 5/77* | (2006.01) |
| *H04N 9/82* | (2006.01) |
| *G01S 19/17* | (2010.01) |
| *H04N 9/804* | (2006.01) |

(52) U.S. Cl.
CPC .............. *B60R 11/04* (2013.01); *G01S 19/17* (2013.01); *G01S 19/23* (2013.01); *G06K 9/00771* (2013.01); *G06K 9/00805* (2013.01); *G11B 27/10* (2013.01); *H04N 5/232* (2013.01); *H04N 5/23216* (2013.01); *H04N 5/77* (2013.01); *H04N 5/772* (2013.01); *H04N 7/18* (2013.01); *H04N 7/188* (2013.01); *H04N 9/8205* (2013.01); *G06K 2009/00738* (2013.01); *H04N 9/8042* (2013.01)

(58) Field of Classification Search
CPC ...... H04N 5/232; H04N 5/23216; H04N 5/77; H04N 5/772; H04N 7/18; H04N 7/188; H04N 9/8205; H04N 9/8042; G06K 2009/00738; G06K 9/00805; G06K 9/0071; G11B 27/10; B60R 11/04; G01S 19/17; G01S 19/23
USPC .......................................................... 348/148
See application file for complete search history.

(56) References Cited

U.S. PATENT DOCUMENTS

| | | |
|---|---|---|
| 6,133,947 A | 10/2000 | Mikuni |
| 7,205,888 B2 * | 4/2007 | Isaji ...................... B60W 10/18 340/435 |
| 7,872,593 B1 | 1/2011 | Rauscher et al. |

(Continued)

*Primary Examiner* — Michael Lee
(74) *Attorney, Agent, or Firm* — Van Pelt, Yi & James LLP

(57) ABSTRACT

A system for capturing an event comprises a processor and a memory. The processor was configured to a) determine that a vehicle is approaching a location of interest; b) capture an image of the location; c) analyze the image to determine a state of the location; and d) modify an event criterion based at least in part on the state of the location. The memory is coupled to the processor and is configured to provide the processor with instructions.

21 Claims, 7 Drawing Sheets

(56) References Cited

U.S. PATENT DOCUMENTS

| | | |
|---|---|---|
| 8,260,489 B2 | 9/2012 | Nielsen et al. |
| 8,301,374 B2 | 10/2012 | Surampudi et al. |
| 8,428,307 B2 | 4/2013 | Bradai et al. |
| 8,699,800 B1 | 4/2014 | Chau |
| 8,849,501 B2 | 9/2014 | Cook et al. |
| 8,854,199 B2 | 10/2014 | Cook et al. |
| 9,298,575 B2 | 3/2016 | Tamari |
| 9,344,683 B1 * | 5/2016 | Nemat-Nasser ........ B60R 11/04 |
| 2002/0008758 A1 | 1/2002 | Broemmelsiek et al. |
| 2003/0055557 A1 | 3/2003 | Dutta |
| 2004/0236474 A1 | 11/2004 | Chowdhary et al. |
| 2004/0236475 A1 | 11/2004 | Chowdhary |
| 2004/0236476 A1 | 11/2004 | Chowdhary |
| 2004/0236596 A1 | 11/2004 | Chowdhary |
| 2005/0216186 A1 | 9/2005 | Dorfman et al. |
| 2007/0257781 A1 | 11/2007 | Denson |
| 2008/0162027 A1 * | 7/2008 | Murphy ................ B60W 50/14 701/117 |
| 2008/0285886 A1 | 11/2008 | Allen |
| 2009/0009321 A1 | 1/2009 | McClellan |
| 2009/0074249 A1 | 3/2009 | Moed et al. |
| 2009/0140887 A1 | 6/2009 | Breed et al. |
| 2009/0187300 A1 | 7/2009 | Everitt et al. |
| 2010/0033571 A1 | 2/2010 | Fujita et al. |
| 2010/0191411 A1 | 7/2010 | Cook et al. |
| 2010/0208070 A2 | 8/2010 | Haynes et al. |
| 2010/0211270 A1 | 8/2010 | Chin et al. |
| 2010/0250045 A1 | 9/2010 | Miura et al. |
| 2010/0256858 A1 * | 10/2010 | Yago .................... G07C 5/0891 701/29.1 |
| 2010/0256863 A1 | 10/2010 | Nielsen et al. |
| 2010/0328009 A1 | 12/2010 | Tawa |
| 2011/0095908 A1 | 4/2011 | Nadeem et al. |
| 2013/0179198 A1 * | 7/2013 | Bowne ............... G06Q 10/0639 705/4 |

* cited by examiner

US 10,166,934 B2

CAPTURING DRIVING RISK BASED ON VEHICLE STATE AND AUTOMATIC DETECTION OF A STATE OF A LOCATION

CROSS REFERENCE TO OTHER APPLICATIONS

This application is a continuation of co-pending U.S. patent application Ser. No. 13/687,163, entitled CAPTURING DRIVING RISK BASED ON VEHICLE STATE AND AUTOMATIC DETECTION OF A STATE OF A LOCATION filed Nov. 28, 2012 which is incorporated herein by reference for all purposes.

BACKGROUND OF THE INVENTION

Modern vehicles (e.g., airplanes, boats, trains, cars, trucks, etc.) commonly include a vehicle event recorder in order to better understand the timeline of and circumstances related to an anomalous event (e.g., an accident). A vehicle event recorder will typically include a set of sensors—for example, video recorders, audio recorders, accelerometers, gyroscopes, vehicle state sensors, GPS (global positioning system), etc.—that report data used to determine the occurrence of an anomalous event, which is then stored for later review of the event. More advanced systems, in addition to detecting anomalous events, attempt to detect risky operator behavior—for example, behavior that is likely to lead to an anomalous event. However, detecting such behavior from the raw sensor data can be very difficult.

BRIEF DESCRIPTION OF THE DRAWINGS

Various embodiments of the invention are disclosed in the following detailed description and the accompanying drawings.

DETAILED DESCRIPTION

Figure 1:
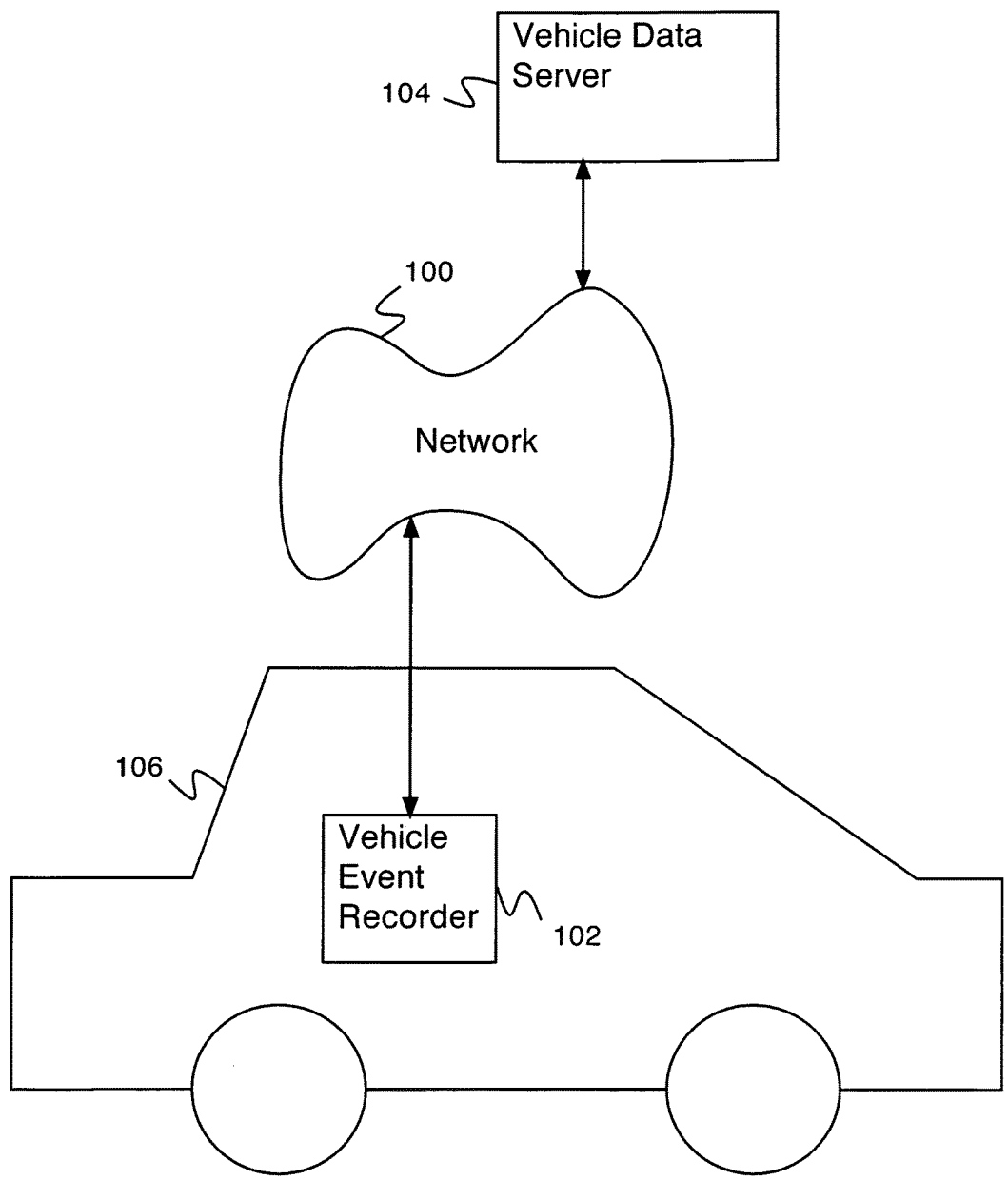
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Capturing driving risk based on vehicle state and automatic detection of a state of a location is disclosed. A system for capturing an event comprises a processor configured to: a) determine that a vehicle is approaching a location of interest, b) capture an image of the location, c) analyze the image to determine a state of the location, d) modify an event criterion based at least in part on the state of the location, and e) detect an event using the event criterion. The system for capturing an event additionally comprises a memory coupled to the processor and configured to provide the processor with instructions.

A vehicle event recorder mounted on a car or truck identifies anomalous events (e.g., accidents) using sensor data. In addition, the vehicle event recorder may attempt to detect risky operator behavior, for example, behavior likely to lead to anomalous events. Certain indications of risky operator behavior are independent of location (e.g., rapid acceleration or deceleration, cornering too fast, speeding, etc.). However, many indications of risky operator behavior are specific not only to a location (e.g., rolling through a stop sign), but also to a state of a location (e.g., running through an intersection when the light of the intersection is a red light state, accelerating through an intersection when the light of the intersection is in a yellow light state, not appropriately yielding right-of-way at an intersection when another vehicle has the right of way—for example, because the other vehicle has a green light and you have a red light, because they arrived at the intersection before you, because there is a pedestrian crossing the crosswalk in front of your vehicle, etc.). These behaviors will not be detected as risky by the vehicle event recorder if the sensor data is consulted without consideration of the vehicle location and the state of the location. However, they can be detected if the vehicle event recorder uses a combination of location awareness and automatic detection of the state of the location.

A vehicle event recorder includes a GPS (global positioning system) with map data. The GPS is able to determine very accurately when the vehicle is entering an intersection, when it is in the intersection, and when it is leaving the intersection. A vehicle event recorder is able to capture driving risk based on vehicle state and location awareness combined with the automatic detection of the state of that intersection (e.g., traffic signal state, pedestrian state of an intersection, additional vehicle in intersection, etc.). The vehicle event recorder includes an image capture trigger based on a GPS indication that the vehicle is entering an intersection. The image capture trigger occurs at an appropriate location approaching the intersection or time before entering the intersection, and may depend on the driver profile, the driver behavior, the vehicle type, time of day, weather conditions, or any other appropriate factors, and may be predetermined according to optimization studies or may adapt automatically and autonomously or via adjustments to parameters determined in subsequent optimization studies. When the image capture trigger is received by an image capture system, an image is captured and analyzed by an image analysis system. The image analysis system determines the state of the intersection, including any signs present (e.g., stop signs, yield signs, etc.), traffic control lights and their current state, the presence and position of other motor vehicles or roadway obstructions, the presence of crosswalks and/or pedestrians, and/or any other relevant aspects of the intersection. The state of the intersection is used to augment the event detection system of the vehicle event recorder. Sensor data is analyzed with consideration of the intersection state. Events are detected based on data that, without consideration of the intersection state, would not have been recognized as anomalous. For instance, if the vehicle travels through the intersection or along a road at a constant rate of 5 MPH, this would normally not trigger any events, but if a pedestrian is recognized in the intersection, a failure to stop event will be triggered. If a yellow light is recognized at the intersection and the vehicle accelerates through the intersection remaining under the speed limit, a warning can be issued for risky behavior, where none would have been previously recognized. These changes to the event detection system can be viewed as a set of modifications to vehicle event triggers—for example, normally acceleration is acceptable below an increase of 5 MPH/second, but in the presence of a yellow light, acceleration is acceptable only below an increase of 1 MPH/second. In various embodiments, in addition to or as an alternative to a GPS, the vehicle position may be determined by an inertial navigation system, GLONASS (Globalnaya Navigatsionnaya Sputnikovaya Sistema, a Russian global navigation satellite system), or any other appropriate positioning system.

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 comprises a set of sensors—for example, video recorders, audio recorders, accelerometers, gyroscopes, vehicle state sensors, GPS, outdoor temperature sensors, moisture sensors, laser line tracker sensors, or any other appropriate sensors. In various embodiments, vehicle state sensors comprise a speedometer, an accelerator pedal sensor, a brake pedal sensor, an engine RPM (revolutions per minute) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises a system for detecting risky behavior. In some embodiments, vehicle event recorder 102 comprises a system for capturing driving risk based on vehicle state and automatic detection of a state of a location (e.g., automatic detection and recognition of traffic signs and signals, pedestrians, vehicles, etc.). In various embodiments, vehicle event recorder 102 is mounted on vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a local area network, a wide area network, the Internet, or any other appropriate network. Vehicle event recorder 102 communicates with vehicle data server 104 via network 100. Vehicle event recorder 102 is mounted on vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In some embodiments, events recorded by vehicle event recorder 102 are downloaded to vehicle data server 104 when vehicle 106 arrives at the home station.

Figure 2:
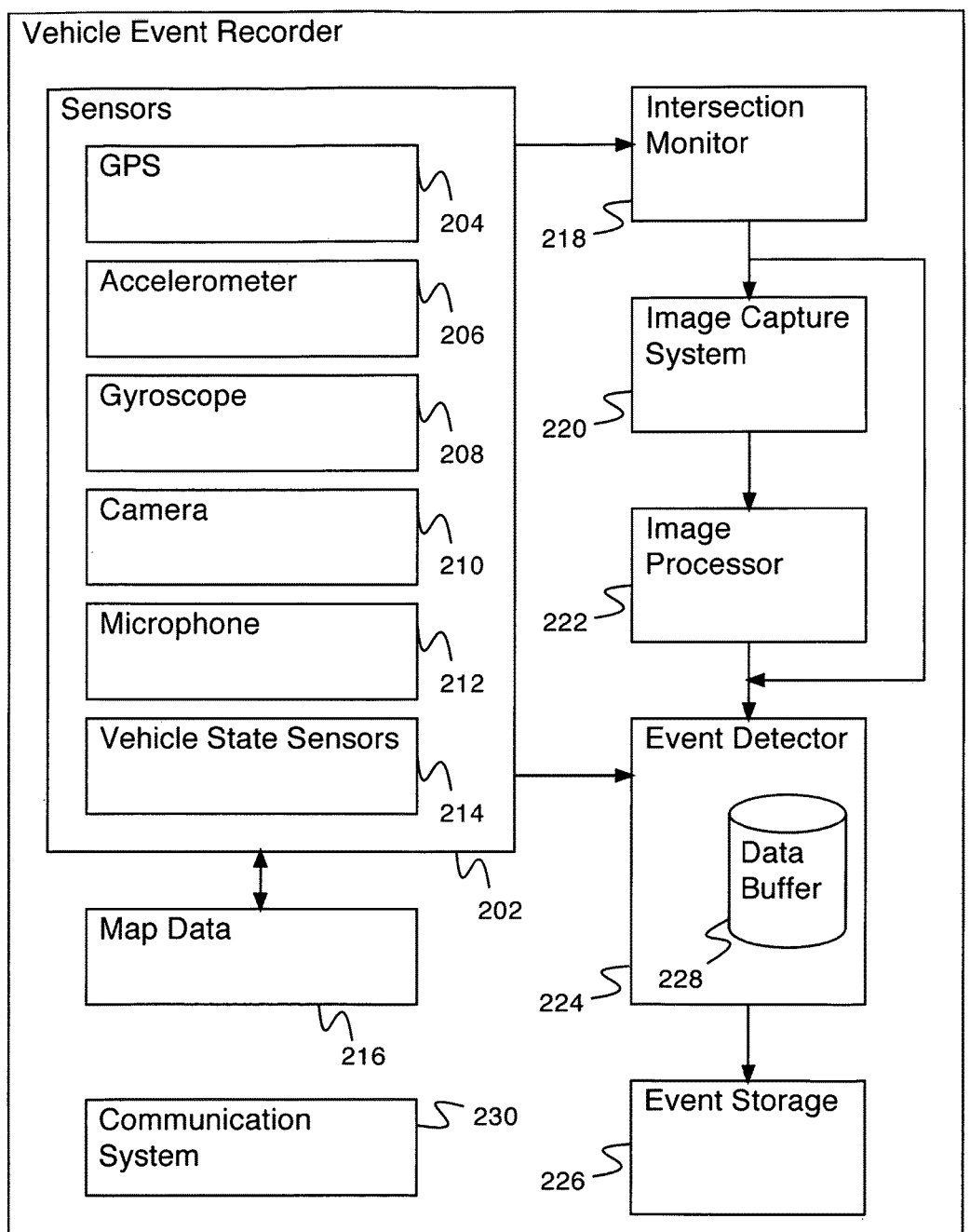
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises sensors 202. Sensors 202 comprise GPS 204, accelerometer 206, gyroscope 208, camera 210, microphone 212, and vehicle state sensors 214. In various embodiments, sensors 202 additionally comprise outdoor temperature sensors, moisture sensors, laser line tracker sensors, or any other appropriate sensors. In various embodiments, vehicle state sensors 214 comprise a speedometer, an accelerator pedal sensor, a brake pedal sensor, an engine RPM sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle state sensors 214 communicate via an OBD (on-board diagnostics) bus. Sensors 202 communicate with map data 216. In some embodiments, GPS 202 communicates with map data 216. In some embodiments, GPS 204 in conjunction with map data 216 can accurately report vehicle position relative to an intersection.

Vehicle event recorder 200 additionally comprises intersection monitor 218, image capture system 220, and image processor 222. Intersection monitor 218 receives and processes data from GPS 204 to determine when to issue an image capture trigger. In some embodiments, intersection monitor 218 processes data from GPS 204 in conjunction with map data 216 to determine when to issue an image capture trigger. In various embodiments, the image capture trigger occurs 1 foot prior to entering an intersection, 10 feet prior to entering an intersection, 25 feet prior to entering an intersection, 1 second prior to entering an intersection, 5 seconds prior to entering an intersection, 12 seconds prior to entering an intersection, or at any other appropriate time or position. In some embodiments, the image capture trigger occurs at a time or position prior to entering the intersection determined by an optimization process (e.g., by comparing photographs taken at different times and positions prior to entering the intersection and determining the optimal time or position). In some embodiments, the image capture trigger time or position is included as part of a driver profile and is customized for each driver. In some embodiments, the image capture trigger time or position adapts to the optimal time or position as the system is used. In some embodiments, the optimal time or position to issue an image capture trigger comprises the time or position at which image capture system 220 has the best possible view of the upcoming intersection and is able to produce the image with the highest probability that image processor 222 will be able to correctly identify the intersection state. In some embodiments, the optimal time or position to issue an image capture trigger comprises the time or position at which objects in the captured image are most likely to be associated with the correct intersection. Image capture system 220 comprises an image capture system for capturing images of the area ahead of the vehicle. When image capture system 220 receives an image capture trigger from intersection monitor 218, image capture system 220 captures an image and delivers it to image processor 222. In some embodiments, image capture system 220 captures images at a constant rate (e.g., one image every 0.1 second) and when image capture system 220 receives an image capture trigger it selects the image corresponding to the trigger time (e.g., a recent image, an image closest to the time associated with the trigger time, etc.) and delivers it to image processor 222. In some embodiments, image capture system 220 captures images at a constant rate and stores them in a circular buffer (e.g., a dedicated image buffer where images are stored sequentially as they are captured, cycling back to the beginning of the buffer when the end is reached). In some embodiments, an image delivered by image capture system 220 to image processor 222 comprises a higher resolution image than is typically recorded by image capture system 220. When image processor 222 receives an image from image capture system 220, it processes the image to determine the intersection state. In various embodiments, determining the intersection state comprises determining the presence of a stop sign, of a yield sign, of a crosswalk, of a pedestrian, of a bicyclist, of a motorcyclist, of an oncoming vehicle, determining the presence and state of a traffic light (e.g., the light that is on, its position, etc.), or determining any other appropriate intersection state.

In some embodiments, an image is captured of a location of interest (e.g., a curve, a hill, an intersection, etc.) and the image is taken at a tailored time or position appropriate to capture the state of the location (e.g., time or position to capture an upcoming curve may differ from an upcoming intersection because, for example, the curve may not be visible until just shortly prior to the curve).

Vehicle event recorder 200 additionally comprises event detector 224 and event storage 226. Event detector 224 receives sensor data from sensors 204, stores sensor data in data buffer 228, and detects events using the sensor data. In some embodiments, event detection is performed using a set of thresholds (e.g., maximum acceptable speed, maximum acceptable acceleration, and/or combinations of thresholds, etc.). In some embodiments, event detection is performed using an event definition (e.g., data from multiple vehicle sensors satisfying criteria simultaneously, data from a sensor meeting a sequential set of criteria, data satisfying a Kalman filter event detection criterion, or any other appropriate event definition). In some embodiments, when an event is detected by event detector 224, data from data buffer 228 is associated with the event. In some embodiments, when an event is detected by event detector 224, data from data buffer 228 from prior to the time of the event is associated with the event (e.g., sensor data or image data leading up to the event is saved). In some embodiments, when event detector 224 receives intersection state data from image processor 222, it changes the set of thresholds used for event detection in response to the intersection state data. In some embodiments, event detector 224 comprises a set of sets of thresholds, each set of thresholds associated with a given intersection state, including one set of thresholds for no intersection. When event detector 224 receives intersection state data from image processor 222, the appropriate set of thresholds is determined, and the event detection thresholds are adjusted to those of the appropriate set. In various embodiments, the event detection thresholds revert to the set of thresholds associated with no intersection after a given period of time, based on being outside the intersection (e.g., a predetermined distance away from the intersection) as measured by GPS 204, or any other appropriate criterion. When event detector 224 detects an event using the event detection thresholds, the event and any appropriate associated sensor data are delivered to event storage 226. Event storage 226 stores event data. In some embodiments, event detector 224 receives the image capture trigger from intersection monitor 218. In some embodiments, event detector 224 associates an event with the time the image capture trigger was received.

In some embodiments, vehicle event recorder 200 transmits event data to a vehicle data server (e.g., vehicle data server 104 of FIG. 1). In some embodiments, vehicle event recorder 200 transmits sensor data (e.g., GPS data, camera data, accelerometer data, video, audio, car sensor data, etc.) to the vehicle data server. In various embodiments, the event is transmitted immediately, at a later time, upon a user request, when the vehicle arrives at a home station, or at any other appropriate time. In some embodiments, vehicle event recorder 200 communicates with the vehicle data server using communications system 230. In some embodiments, communications system 230 communicates with a network (e.g., network 100 of FIG. 1).

Figure 3:
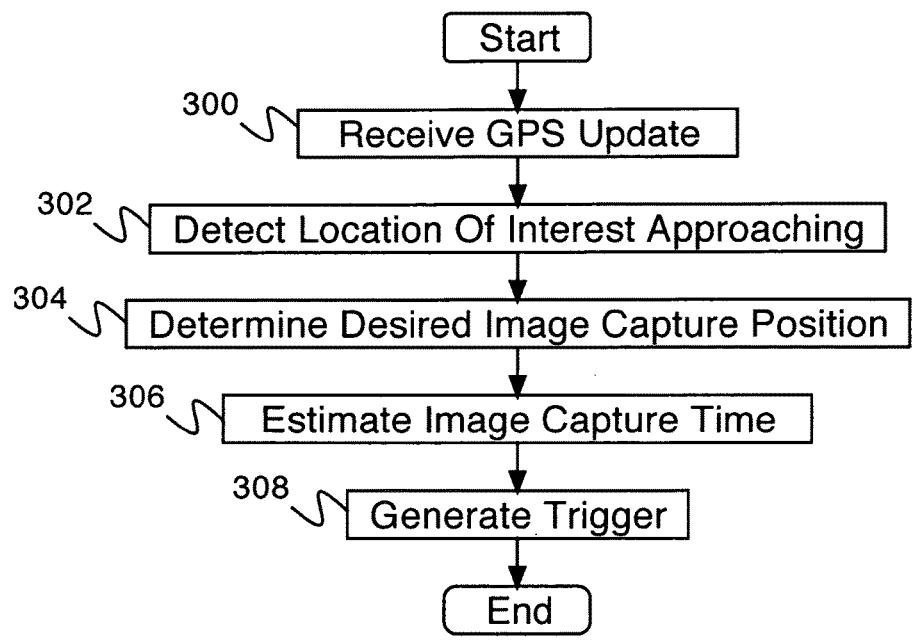
FIG. 3 is a flow diagram illustrating an embodiment of a process for generating an image capture trigger.

FIG. 3 is a flow diagram illustrating an embodiment of a process for generating an image capture trigger. In some embodiments, the process of FIG. 3 is executed by intersection monitor 218 of FIG. 2. In the example shown, in 300, a GPS update is received. In some embodiments, a GPS update is received from a GPS (e.g., GPS 204 of FIG. 2). In some embodiments, the GPS update is combined with map data (e.g., map data 216 of FIG. 2) to provide map location information. In 302, a location of interest approaching is detected. In some embodiments, an intersection monitor determines a location of interest is approaching. In some embodiments, determining a location of interest is approaching comprises analyzing data (e.g., sensor data, map data, GPS data, etc.) until it is determined that a location of interest is approaching. For example, a location designated as an intersection is approaching, a location where more than one road segment meet, etc. In some embodiments, data is received and it is determined that a location of interest is approaching (e.g., that the GPS location is moving towards the location of interest and will intersect the location of interest). In some embodiments, if it is determined that a location of interest is not approaching, data is continued to be received and the process waits until it is determined that a location of interest is approaching. In various embodiments, a location of interest comprises an intersection, a road fork, a driveway or access road intersecting a main roadway, or any other appropriate location of interest. In some embodiments, a GPS update includes an indication that a location of interest is approaching (e.g., a message indicating the current position, the position of interest, an estimated time of arrival at the position of interest, etc.). In 304, a desired image capture position is determined. In some embodiments, the desired image capture position comprises the optimal position for capturing an image of the location of interest. In some embodiments, the desired image capture position comprises the image capture position most likely to provide an image of the location of interest that can be analyzed for state information. In 306, the image capture time is estimated. In some embodiments, the image capture time is estimated using a combination of the desired image capture position (e.g., the desired image capture position determined in 304) and sensor data (e.g., sensor data received from sensors 202 of FIG. 2). In some embodiments, the image capture time is estimated using an estimate of vehicle speed. In some embodiments, vehicle speed is estimated from GPS information. In some embodiments, vehicle speed is estimated from vehicle state sensors (e.g., vehicle state sensors 214 of FIG. 2, a speedometer, etc.). In some embodiments, the image capture time is estimated using data from other sensors (e.g., accelerometer data, gyroscope data, etc.). In 308, a trigger is generated. In some embodiments, a trigger is generated at the image capture time (e.g., the image capture time estimated in 306). In some embodiments, the trigger is sent to an image capture system (e.g., image capture system 220 of FIG. 2).

Figure 4:
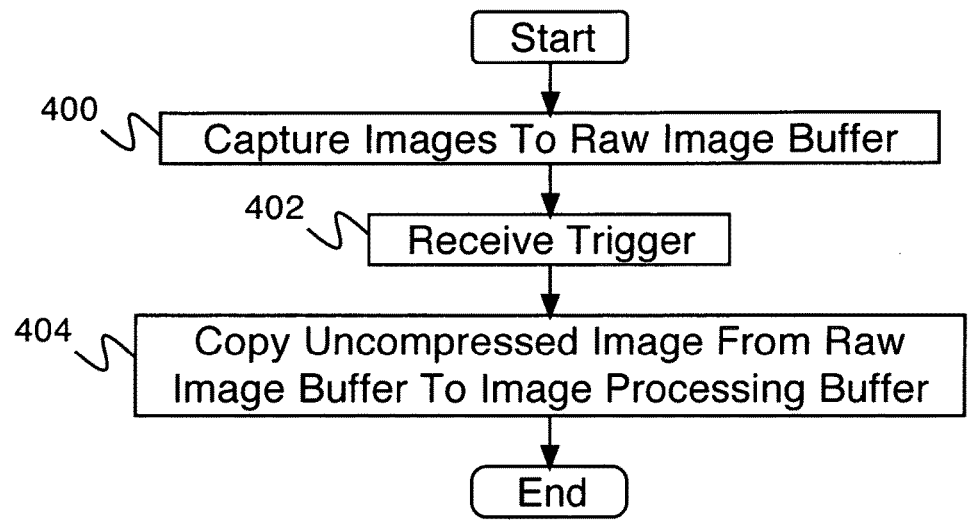
FIG. 4 is a flow diagram illustrating an embodiment of a process for capturing an image in response to an image capture trigger.

FIG. 4 is a flow diagram illustrating an embodiment of a process for capturing an image in response to an image capture trigger. In some embodiments, the process of FIG. 4 is executed by an image capture system (e.g., image capture system 220 of FIG. 2). In 400, images are captured to a raw image buffer. For example, raw images are captured and stored temporarily in an image buffer; in the event that a trigger is received, the raw image is saved or transferred for processing. Raw images are either overwritten or compressed for storage (e.g., if related to an event). In some embodiments, images are captured to the raw image buffer at a predetermined rate (e.g., 1 image per second, 10 images per second, 1000 images per second, etc.). In some embodiments, the raw image buffer comprises a circular buffer (e.g., a dedicated image buffer where images are stored sequentially as they are captured, cycling back to the beginning of the buffer when the end is reached and overwriting the previously stored images). In some embodiments, images are captured by the image capture system to the raw image buffer for use by multiple subsystems of the vehicle event recorder (e.g., vehicle event recorder 102 of FIG. 1). In some embodiments, images are captured by the image capture system to the raw image buffer for the purpose of recording vehicle events. In some embodiments, images in the raw image buffer comprise raw images and are compressed before storage as part of a vehicle event recording. In 402, a trigger is received. In some embodiments, an image capture trigger is received from an intersection monitor (e.g., intersection monitor 218 of FIG. 2). In some embodiments, an image capture trigger indicates that a location of interest (e.g., an intersection) is approaching and an image of the location of interest should be captured for the purpose of determining its state. In some embodiments the image capture system determines that an image capture trigger is received. In some embodiments, in the event an image capture trigger is not received, the process waits until an image capture trigger is received. In 404, an uncompressed image is copied from the raw image buffer to the image processing buffer. In some embodiments, the image processing buffer comprises a buffer for images to be processed by an image processor (e.g., image processor 222 of FIG. 2). In some embodiments, the image processor produces better image processing results using an uncompressed image.

Figure 5:
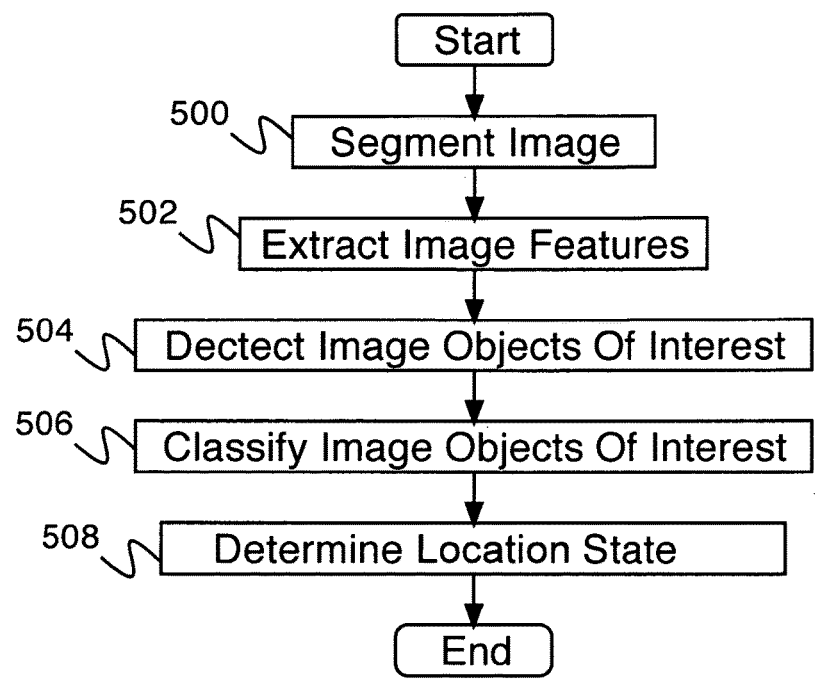
FIG. 5 is a flow diagram illustrating an embodiment of a process for determining a location state.

FIG. 5 is a flow diagram illustrating an embodiment of a process for determining a location state. In some embodiments, the process of FIG. 5 is executed by an image processor (e.g., image processor 222 of FIG. 2). In the example shown, in 500, an image is segmented. For example, the image comprises an image received from an image capture system (e.g., received from image capture system 220 of FIG. 2). In some embodiments, the image comprises an uncompressed image. In 502, image features are extracted. For example, extracting image features comprises extracting prominent image elements for image recognition. In 504, image objects of interest are detected. For example, detecting image objects of interest comprises determining whether each image feature comprises an image object of interest. In various embodiments, an image object of interest comprises a stop sign, a yield sign, a traffic light, a crosswalk, a pedestrian, a bicyclist, a motorcyclist, an oncoming vehicle, or any other appropriate object of interest. In some embodiments, detecting image objects of interest comprises detecting an object state, e.g., detecting the state of a traffic light. In 506, image objects of interest are classified. In 508, a location state is determined. In some embodiments, a location state (e.g., an intersection, a curve, a dangerous area, a busy area, a high traffic area, etc.) is determined from the classified objects of interest and their current state. In some embodiments, location state is determined to be one of a set of possible states.

Figure 6:
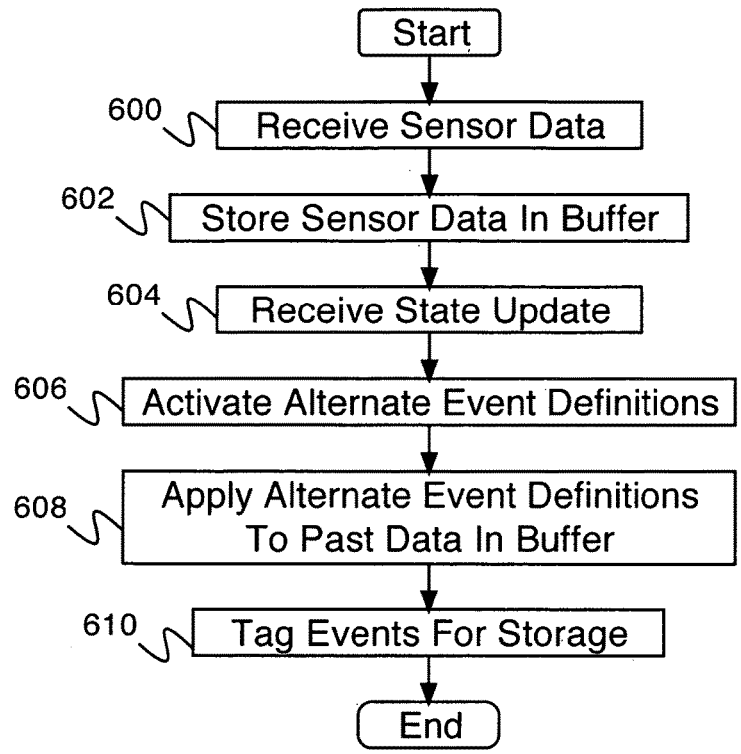
FIG. 6 is a flow diagram illustrating an embodiment of a process for detecting an event at a location.

FIG. 6 is a flow diagram illustrating an embodiment of a process for detecting an event at a location. In some embodiments, the process of FIG. 6 is executed by event detector 224 of FIG. 2. In the example shown, in 600, the event detector receives sensor data (e.g., from sensors 202 of FIG. 2). In various embodiments, sensor data comprises GPS data, accelerometer data, gyroscope data, camera data, microphone data, vehicle state sensor data, or any other appropriate sensor data. In various embodiments, vehicle state sensor data comprises speedometer data, accelerator pedal sensor data, brake pedal sensor data, engine RPM sensor data, engine temperature sensor data, headlight sensor data, airbag deployment sensor data, driver and passenger seat weight sensors data, or any other appropriate vehicle state sensor data. In 602, sensor data is stored in a buffer (e.g., data buffer 228 of FIG. 2). In some embodiments, the event detector is triggered to store an event based on sensor data in the buffer—sensor data in the buffer comprises data stored from the present time back to sometime in the past (e.g., an amount of time based on the size of a circular buffer, a sample rate, and a data size for each sample for the sensor(s)). In some embodiments, in the event an event has been detected, the event detector stores past data as part of the detected event (e.g., to show what happened leading up to the event). In some embodiments, the event detector stores data after the detected event by continuing to store data after the event trigger. In some embodiments, the event detector receives sensor data and stores the sensor data in a buffer at a predetermined rate (e.g., 1 time per second, 10 times per second, 100 times per second, etc.). In 604, a state update is received. In some embodiments, the event detector determines that a state update is received,—for example, the event detector determines that a state update is received by observing the output of the image processor. In some embodiments, the state update comprises an indication of one of a set of possible states. In various embodiments, a traffic light or traffic light intersection has a set of states comprising one or more of the following: red, amber, green, turn arrow, flashing red, and any other appropriate state. In various embodiments, an intersection has a set of states comprising one or more of the following: no controls, stop signs in the vehicle direction, stop signs perpendicular to the vehicle direction, cross walk, pedestrian in crosswalk, vehicle in intersection, vehicle approaching intersection on left, vehicle approaching intersection on right, a traffic controller present, and any other appropriate state. In various embodiments, a crosswalk location has a set of states comprising one or more of the following: no pedestrians present, a pedestrian present, multiple pedestrians present, a pedestrian crossing in front of the vehicle, a pedestrian crossing parallel to the vehicle direction of motion, or any other appropriate state. In various embodiments, a left turn lane location has a set of states comprising one or more of the following: a vehicle present in the left turn lane, a vehicle present in the left turn lane in oncoming direction, a vehicle present in the left turn lane in the same direction, a vehicle not present in left turn lane, or any other appropriate state.

In 606, alternate event definitions are activated. In some embodiments, in the event that the event detector does not determine that a state update is received, alternate event definitions are not activated. In some embodiments, there exists a set of default event definitions. In some embodiments, alternate event definitions comprise alternate criteria for detecting an event from received sensor data. In some embodiments, alternate event definitions comprise alternate thresholds. In some embodiments, alternate event definitions comprise a set of alternate event definitions. In some embodiments, the set of alternate event definitions comprises one of a set of possible sets of alternate event definitions. In some embodiments, the state indicated by the state update corresponds to one of a set of alternate event definitions. For example, in the event the state indicated by the state update indicates an intersection with a stop sign, an alternate event definition is activated where an event is generated if the vehicle proceeds through the intersection without stopping. In the event the state indicated by the state update indicates a red traffic light, an event is generated if the vehicle proceeds through the intersection without coming to a complete stop and waiting until the light is green. In the event the state indicated by the state update indicates a yellow traffic light, the acceleration threshold is set so that an event is generated if the vehicle accelerates significantly—for example, set to 1 MPH/s. In the event the state indicated by the state update indicates a green traffic light, event definitions may not need to be changed (e.g., thresholds stay the same). In some embodiments, in the event the state indicated by the state update indicates a green traffic light, event definitions are changed back to default event definitions. In the event the state indicated by the state update indicates the presence of a pedestrian in a nearby crosswalk, the speed limit for event detection is set to a lower limit (e.g., 25 MPH). States indicated by state updates can indicate one or more than one object of interest and modify any appropriate number of thresholds or event definitions. In some embodiments, the mere presence of an intersection can be sufficient to cause the modification of event generation criteria.

In 608, alternate event definitions are applied to past data in the buffer. In some embodiments, events are identified. In some embodiments, events are identified associated with past data. In some embodiments, events are identified associated with a time in the past (e.g., it is determined that three seconds previously, the driver did not stop for a pedestrian in an crosswalk of an intersection). In some embodiments, events are associated with the time the trigger was sent by the intersection monitor (e.g., intersection monitor 218 of FIG. 2). In some embodiments, the event detector receives the trigger from the intersection monitor. In some embodiments, identifying events comprises recording video. In some embodiments, identifying events comprises recording sensor data. In 610, events are tagged for storage (e.g., for storage in event storage 226 of FIG. 2). In some embodiments, if events are detected in 608 applying the alternate event definitions to past data in the buffer, the detected events are tagged for storage in 610. In some embodiments, events are stored.

Figure 7:
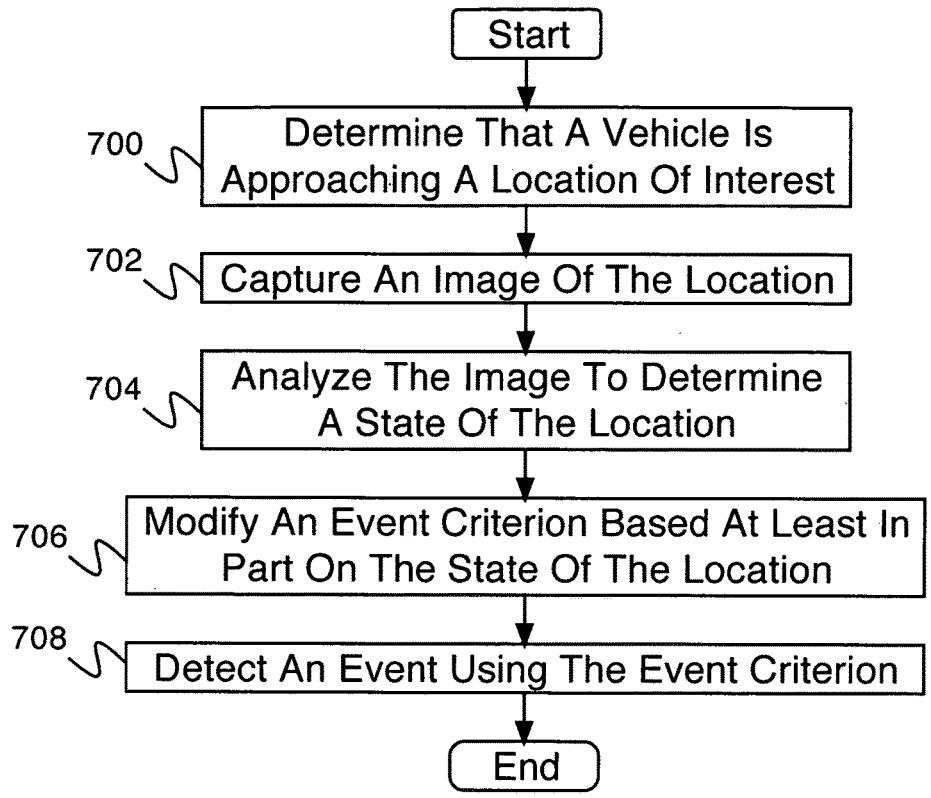
FIG. 7 is a flow diagram illustrating an embodiment of a process for capturing driving risk based on vehicle state and a state of a location.

FIG. 7 is a flow diagram illustrating an embodiment of a process for capturing driving risk based on vehicle state and automatic detection of a state of a location. In some embodiments, the state of a location comprises an awareness of a state of a location based at least in part on an automatic detection and recognition of traffic signs and signals. In some embodiments, the process of FIG. 7 is executed by vehicle event recorder 102 of FIG. 1. In the example shown, in 700, it is determined that a vehicle is approaching a location of interest. In some embodiments, locations of interest may include merging lanes, forks in the road, highway on-ramps or off-ramps, or any other appropriate locations. For example, based on location of interest data and position data, the vehicle is determined to be approaching a location of interest. In some embodiments, the location of interest comprises an intersection. In some embodiments, in the event it is determined that the vehicle is not approaching a location of interest, the process waits. In 702, an image is captured of the location. For example, at an appropriate distance or time prior to reaching the location an image is captured or selected from a series of images. In some embodiments, a desired image capture position is determined. In some embodiments, a desired image capture position is determined by an intersection monitor. In some embodiments, a desired image capture time is determined. In some embodiments, capturing an image of the location comprises identifying a video frame recorded while approaching the location. In some embodiments, capturing an image of the location comprises copying an image from a raw image buffer to an event memory. In some embodiments, multiple images are captured and analyzed to determine the state of the location of interest. In various embodiments, a sequence of successive frames (e.g. a video sequence) is analyzed to improve the segmentation and/or recognition of objects such as traffic signs. In 704, the image is analyzed to determine a state of the location. In various embodiments, determining a state of the location comprises determining street signs present at the location, determining the state of traffic lights at the location, determining the position and/or presence of pedestrians and/or vehicles (e.g., cars, trucks, bicycles, motorcycles, etc.) at the location, or determining any other appropriate location state information. In some embodiments, the state of the location is determined to be one of a set of one or more possible states (e.g., red light, green light, yellow light for state of a light at a location). In some embodiments, each state of the one or more possible states is associated with one or more event criterion modifications. In 706, an event criterion is modified based at least in part on the state of the location. In some embodiments, modifying an event criterion comprises modifying a threshold. In some embodiments, modifying an event criterion comprises activating an alternate event definition. In some embodiments, the alternate event definition comprises one of a set of one or more possible alternate event definitions. In 708, an event is detected using the event criterion. In some embodiments, the event is recorded. In some embodiments, recording the event comprises recording video. In some embodiments, recording the event comprises recording sensor data. In some embodiments, the event is stored. In some embodiments, the event is transmitted. In various embodiments, the event is transmitted immediately, at a later time, upon a user request, when the vehicle arrives at a home station, or at any other appropriate time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for capturing an event, comprising:
   an interface to receive a vehicle location based at least in part on a GPS data;
   a processor to:
   determine that a vehicle is approaching a location of interest based at least in part on the vehicle location;
   determine an estimated image capture time for the location of interest, wherein determining the estimated image capture time is based at least in part on a driver profile;
   capture an image of the location of interest at the estimated capture time;
   determine a state of the location of interest; and
   detect an event based at least in part on the state of the location of interest.

2. The system of claim 1, wherein the location of interest comprises an intersection.

3. The system of claim 1, wherein the processor is further to determine a vehicle position for image capture.

4. The system of claim 1, wherein capturing the image of the location of interest comprises identifying a video frame.

5. The system of claim 1, wherein capturing the image of the location of interest comprises copying an image from a raw image buffer to an event memory.

6. The system of claim 1, wherein determining the state of the location of interest comprises determining that a street sign is present.

7. The system of claim 1, wherein determining the state of the location of interest comprises determining a state of a traffic light.

8. The system of claim 1, wherein determining the state of the location of interest comprises determining a presence of a pedestrian.

9. The system of claim 1, wherein determining the state of the location of interest comprises determining a presence of a vehicle.

10. The system of claim 1, wherein the state of the location of interest is determined to be one of a set of one or more possible states.

11. The system of claim 10, wherein each state of the one or more possible states is associated with one or more event criterion modifications.

12. The system of claim 1, wherein the processor is further to modify an event criterion by modifying a threshold.

13. The system of claim 12, wherein modifying the event criterion comprises activating an alternate event definition.

14. The system of claim 1, wherein the processor is further to record the event.

15. The system of claim 14, wherein recording the event comprises recording video.

16. The system of claim 14, wherein recording the event comprises recording sensor data.

17. The system of claim 1, wherein the processor is further to store the event.

18. The system of claim 1, wherein the processor is further to transmit the event.

19. The system of claim 18, wherein the event is transmitted at one of the following times: immediately, at a later time, upon a user request, when the vehicle arrives at a home station.

20. A method for capturing an event, comprising:
    receiving a vehicle location based at least in part on a GPS data;
    determining, using a processor, that a vehicle is approaching a location of interest based in the at least in part on the vehicle location;
    determining an estimated image capture time for the location of interest, wherein determining the estimated image capture time is based at least in part on a driver profile;
    capturing an image of the location of interest at the estimated capture time;
    determining a state of the location of interest; and
    detecting an event based at least in part on the state of the location of interest.

21. A computer program product for capturing an event, the computer program product being embodied in a non-transitory computer readable storage medium and comprising computer instructions for:
    receiving a vehicle location based at least in part on a GPS data;
    determining that a vehicle is approaching a location of interest based at least in part on the vehicle location;
    determining an estimated image capture time for the location of interest, wherein determining the estimated image capture time is based at least in part on a driver profile;
    capturing an image of the location of interest at the estimated capture time;
    determining a state of the location of interest; and
    detecting an event based at least in part on the state of the location of interest.

* * * * *

UNITED STATES PATENT AND TRADEMARK OFFICE
CERTIFICATE OF CORRECTION

PATENT NO. : 10,166,934 B2  
APPLICATION NO. : 14/998043  
DATED : January 1, 2019  
INVENTOR(S) : Syrus C. Nemat-Nasser and Christopher S. Williams Page 1 of 1

It is certified that error appears in the above-identified patent and that said Letters Patent is hereby corrected as shown below:

In the Drawings

Drawing Sheet 5 of 7, Reference no.: 504, delete "dectect" and insert --detect--, therefor.

Signed and Sealed this  
Twenty-sixth Day of March, 2019

Andrei Iancu  
*Director of the United States Patent and Trademark Office*